G. Reneky & J. Keiss, Washing Machine

PATENTED DEC 17 1867

72328

Witnesses
Theo. Insch
Wm. Trewin

Inventor
G. Reneky
J. Keiss
Per Munn & Co.
Attorneys

United States Patent Office.

G. RENEKY AND J. KEISS, OF CEDAR FALLS, IOWA.

Letters Patent No. 72,328, dated December 17, 1867.

IMPROVED WASHING-MACHINE.

*The Schedule referred to in these Letters Patent and making part of the same.*

TO ALL WHOM IT MAY CONCERN:

Be it known that we, G. RENEKY and J. KEISS, of Cedar Falls, in the county of Black Hawk, and State of Iowa, have invented a new and useful Improvement in Washing-Machine; and we do hereby declare that the following is a full, clear, and exact description thereof, which will enable others skilled in the art to make and use the same, reference being had to the accompanying drawings, forming part of this specification.

Similar letters of reference indicate corresponding parts.

Our invention has for its object to furnish an improved washing-machine, simple in construction, easily operated, and doing its work quickly and thoroughly; and it consists in the construction, combination, and arrangement of the various parts, as hereinafter more fully described.

Figure 1:
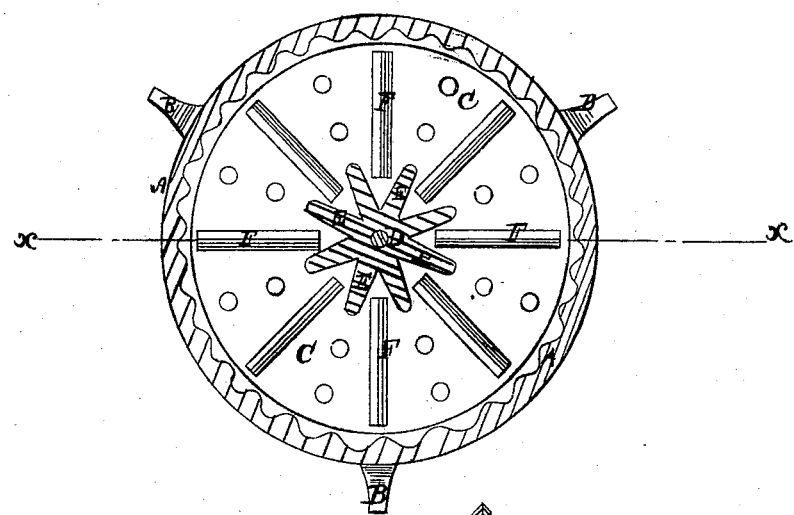
Figure 1 is a horizontal section of our improved machine, taken through the line $y\,y$, fig. 2.
Figure 2:
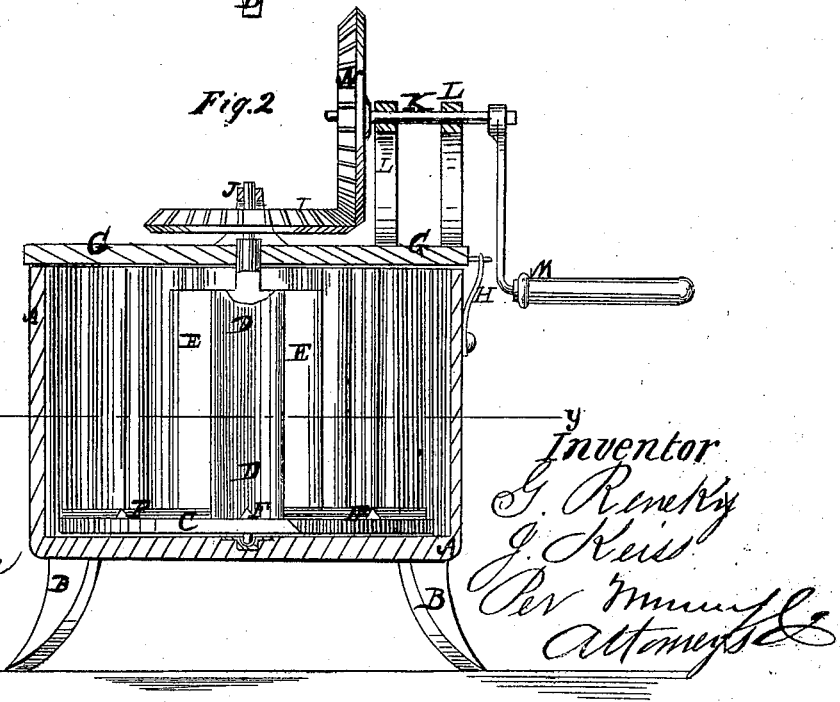
Figure 2 is a vertical section of the same, taken through the line $x\,x$, fig. 1.

A is a cylindrical tub, supported upon feet B, of such a length as to support the tub at a convenient height. The inner surface of the sides of the tub A is corrugated vertically, as shown in figs. 1 and 2. C is a circular disk, of such a size as to fit into and revolve freely in the lower part of the tub A, and which is rigidly and strongly attached to the lower end of the vertical shaft D. To the lower end of the shaft D, or to the centre of the disk C is attached a pin or journal, which works in a socket formed in or attached to the centre of the bottom of the tub A. To the side of the shaft D are rigidly attached vertical wings or flanges E, as shown in figs. 1 and 2. To the upper surface of the revolving disk C, are attached eight radial strips or flanges, F, the inner ends of which enter into the spaces between the wings or flanges E, and the outer ends of which extend out to or nearly to the circumference of said disk C. Holes may be formed through the disk C to allow the water to pass through freely when raising the disk out of the tub, so that the said disk may be removed with ease. G is the cover, to which the gearing that drives the shaft D and disk C is attached, and which is secured to the top of the tub A by hooks H, and which may wholly or partially cover the top of the tub A, as may be desired. I is a horizontal bevel-gear wheel, the lower journal of which passes through and revolves in the centre of the cover G, and the lower end of which is made square, and fits into a square socket formed in the upper end of the shaft D, so as to communicate motion from said gear-wheel to said shaft. The upper journal of the gear-wheel I works in bearings in the support J attached to the cover G. K is a shaft which revolves in bearings in the supports or brackets L attached to the cover G, and to which motion is imparted by means of the crank M attached to its outer end. To the inner end of the shaft K is attached a bevel-gear wheel, N, in such a position that its teeth may mesh into the teeth of the horizontal bevel-gear wheel I, as shown in fig. 2.

In using the machine, the clothes are placed upon the revolving flanged disk C, between the winged or flanged shaft D and the corrugated sides of the tub A. Upon operating the machine, the clothes are carried about by the disk C and winged shaft D, but at a less velocity than that at which said parts move, being all the time acted upon or rubbed by the said wings, flanges, and corrugations, which also produce the additional effect of constantly turning the clothes, so that they may be acted upon in all their parts.

We claim as new, and desire to secure by Letters Patent—

1. The vertical shaft D, having vertical wings or flanges E rigidly attached to it, and perforated disk C, having radial flanges F rigidly attached to it, said shaft and disk being rigidly connected together, in combination with the corrugated tub A, substantially as herein shown and described, and for the purpose set forth.

2. The combination of the crank M, shaft K, bevel-gear wheels N and I, and cover G with each other, with the winged or flanged shaft D, and flanged disk C, and with the corrugated tub A, substantially as herein shown and described, and for the purpose set forth.

G. RENEKY,
J. KEISS.

Witnesses:
JOHN MANBERT,
I. E. WILCOX.